United States Patent [19]

Kostiner

[11] 4,190,357
[45] Feb. 26, 1980

[54] PHOTOGRAPHIC ENLARGING EASEL

[76] Inventor: Edward Kostiner, 218 Oakridge Dr., Baie d'Urfe, Quebec, Canada, H9X 2N4

[21] Appl. No.: 953,074

[22] Filed: Oct. 20, 1978

[51] Int. Cl.² .............................................. G03B 27/58
[52] U.S. Cl. ...................................................... 355/74
[58] Field of Search .................................. 355/72, 74

[56] References Cited

U.S. PATENT DOCUMENTS

| 2,199,304 | 4/1940 | Dewey | 355/74 |
|---|---|---|---|
| 2,458,648 | 1/1949 | Saunders | 355/74 |
| 2,822,723 | 2/1958 | Grey | 355/72 |
| 2,848,923 | 8/1958 | Diefenbach | 355/74 |
| 4,150,895 | 4/1979 | Northrup et al. | 355/74 |

*Primary Examiner*—Donald A. Griffin
*Attorney, Agent, or Firm*—Larson, Taylor and Hinds

[57] ABSTRACT

A photographic enlarging easel is disclosed for positioning and masking photographic paper on a base plate. The easel allows the paper to be positioned anywhere on the base plate and provides masking blades that are removable and can be moved anywhere on the easel. The easel has a base plate with a flat surface for the paper, a rectangular open frame formed of four members, each having substantially similar cross sections, the frame pivoted about a pivot line parallel to and extending outside one edge of the base plate, the frame when in the closed position resting on the flat surface of the base plate allowing the paper to extend beyond the base plate. Paper positioning means are also provided for locating the paper on the base plate, and a plurality of removable carriages, each carriage having a masking blade with a first end rigidly attached thereto, each carriage adapted to slide on a carriage formed integral with each member and extending from side to side of the frame, a second end of the masking blade adapted to slide in a guide slot on an opposite member of the frame, the masking blade resting on the flat surface of the base plate when the frame is in the closed position, each carriage having a locking means to lock the carriage to the member at any position on the track. The frame has at least two sliding scales in each of two places adapted to measure border widths on four sides of the paper in any location in the frame.

12 Claims, 4 Drawing Figures

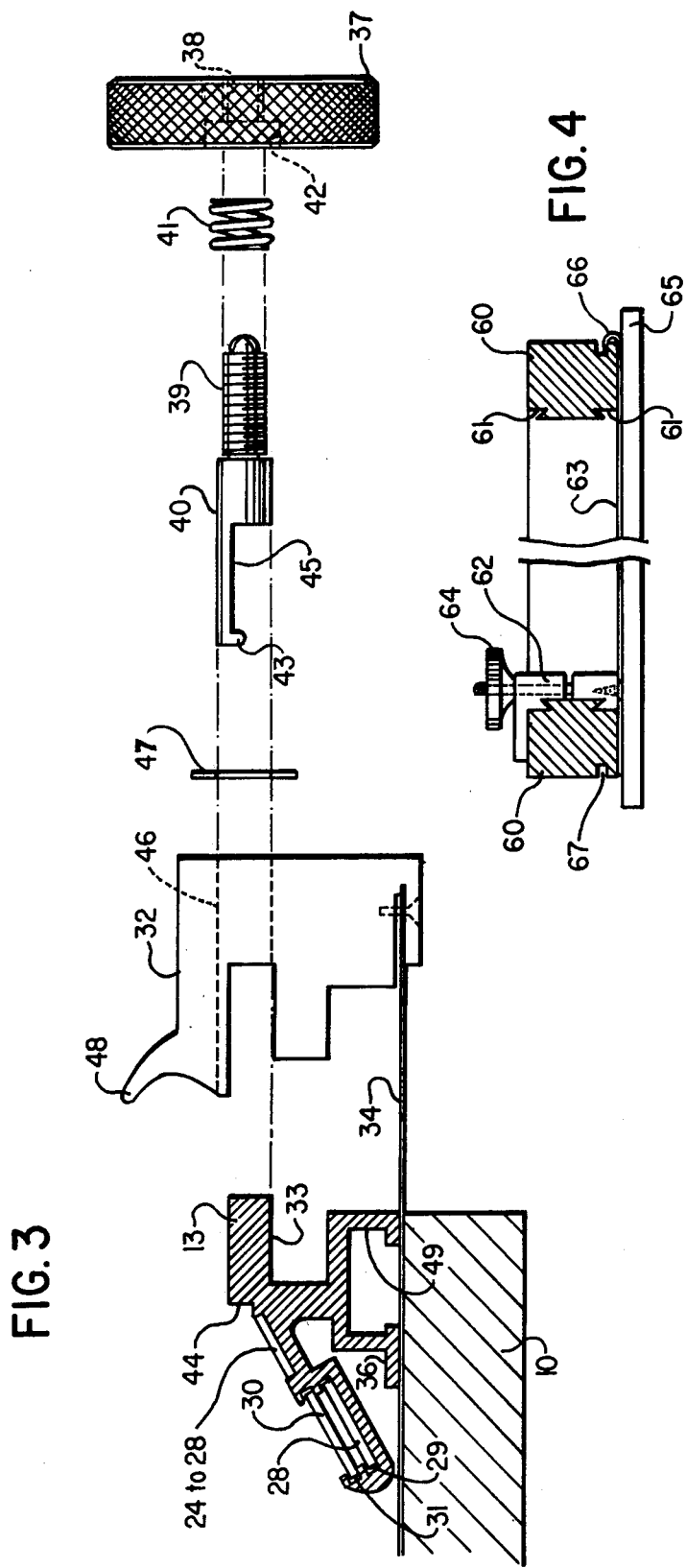

PHOTOGRAPHIC ENLARGING EASEL

This invention relates to a photographic enlarging easel for positioning and masking a sheet of photographic paper on a base plate.

Photographic enlarging easels such as that shown by Saunders in U.S. Pat. No. 2,458,648 have been known for many years. The easels have four masking blades supported by an open frame which is hinged to a base plate. These types of four bladed easels are generally designed to position different sizes of photographic paper in different slots. In the majority of easels the masking blades only move halfway across the face of the easel which means that small prints must always be positioned in the approximate centre of the easel. This sometimes presents an interference problem between the edge of the easel and the post of the enlarger. Other easels such as the type shown by Smith in U.S. Pat. No. 3,622,240 have a side hinge or support arm to hold the frame in an open position above the base plate and this prevents a sheet of paper extending beyond the edge of the base plate. Saunders in U.S. Pat. No. 3,273,452 shows another type of easel which has an open frame extending down below the top surface of the base plate thus a sheet of paper which extended beyond the edge of the base plate could not be printed.

Most known types of four bladed easels have the masking blades fixed in slots or tracks in side members of the frame. No provisions are made to remove or replace one or more masking blades, and if a blade becomes bent or damaged in some way, it is necessary to replace the complete easel. Furthermore, none of the existing easels are able to have special blades inserted. By special blades are included borderless blades for printing colour and black and white prints with no borders, blades to produce diamond, oval or other shapes of printed images. In existing types of easels the masking blades are formed integral with a carriage which in turn slides in tracks on the sides of the frame. However, there is no positive lock provided to hold the blade in a specific position, generally just a friction lock is provided which does not hold the blade rigidly in a positive perpendicular position. Fixed scales are sometimes provided on the sides of an easel frame or in some easels a sliding scale is attached to the carriage holding a masking blade. However, in all existing four bladed easels the scales are used to measure the overall width or length of the paper or the image but not the width of the required border.

It is a purpose of the present invention to provide an easel for photographic enlarging with two sliding scales in each of two planes to measure the width of the border on the four sides of a print regardless of position of paper on the easel. It is a further purpose to provide a photographic enlarging easel wherein masking blades can be positively locked to the frame at any desired position.

It is another purpose of the present invention to provide a novel easel for photographic enlarging wherein the photographic paper may be positioned anywhere on the easel and even overlap one or more edges of the base plate of the easel if necessary.

The easel of the present invention provides masking blades that can be moved anywhere on the easel permitting photographic paper of standard or non-standard size to be positioned by positioning means at any location on the easel. Furthermore, sliding scales are provided to measure the width of each border required on the print regardless of the position of the paper. With this flexibility of positioning the paper on the easel, most of the problems of interference between the enlarger post and the easel are eliminated, and a total flexibility in image cropping is possible.

In a preferred embodiment the easel has no side hinges or support arms to prevent the paper from overlapping the side edge of the base plate and two sliding scales are provided in each of two planes of the frame so that the positioning of the masking blades can be measured for different border widths on the four sides of any size of paper. Furthermore, the masking blades may be removed and replaced with special masking blades. In a preferred embodiment, the frame of the easel has four members of the same length forming a square frame and the masking blades may be fitted either way across the square frame. In another embodiment, special effect blades may be mounted on the frame and in a still further embodiment a magnetic field holds the blades in contact with the base plate.

The present invention provides a photographic enlarging easel for positioning and masking a sheet of photographic paper comprising, base plate having a flat surface for the sheet of paper, rectangular open frame formed of four members each having substantially similar cross sections, the frame pivoted about a pivot line parallel to and extending outside one edge of the base plate, the frame when in a closed position resting on the flat surface of the base plate, allowing the sheet to extend beyond the base plate, paper positioning means for locating the paper on the base plate, plurality of removable carriages, each carriage having a masking blade with a first end rigidly attached thereto, each carriage adapted to slide on a carriage track formed integral with each member and extending from side to side of the frame, a second end of the masking blade adapted to slide in a guide slot on an opposite member of the frame, the masking blade resting on the flat surface of the base plate when the frame is in the closed position, each carriage having a locking means to lock the carriage to the member at any position on the track, the frame having at least two sliding scales in each of two planes adapted to measure border widths on four sides of the sheet in any location in the frame, In drawings which illustrate embodiments of the invention, FIG. 1 is a plan view of one embodiment of a photographic enlarging easel according to the present invention.

FIG. 3 is an exploded side view showing one embodiment of a locking means for the carriage shown in FIGS. 1 and 2.

FIG. 4 is a cross sectional elevation through another embodiment of a carriage and masking blade arrangement of a photographic enlarging easel.

Figure 1:
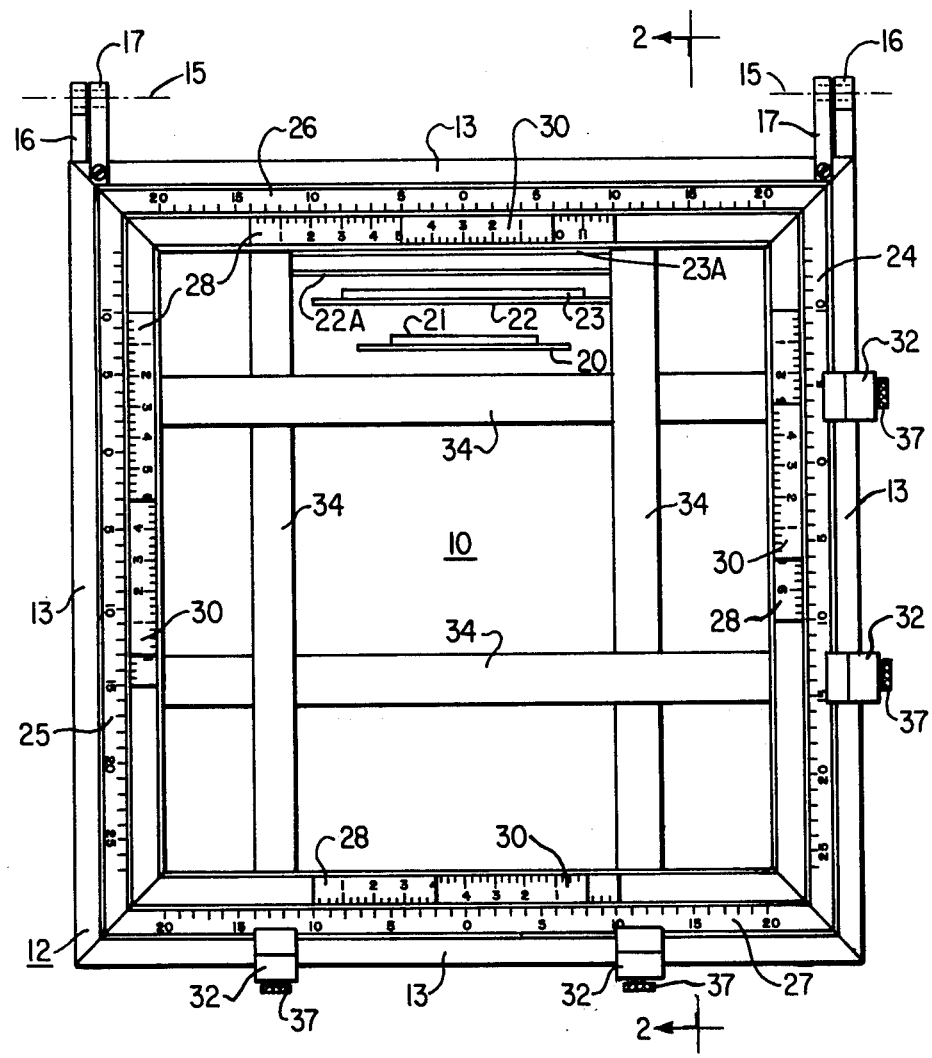
Figure 2:
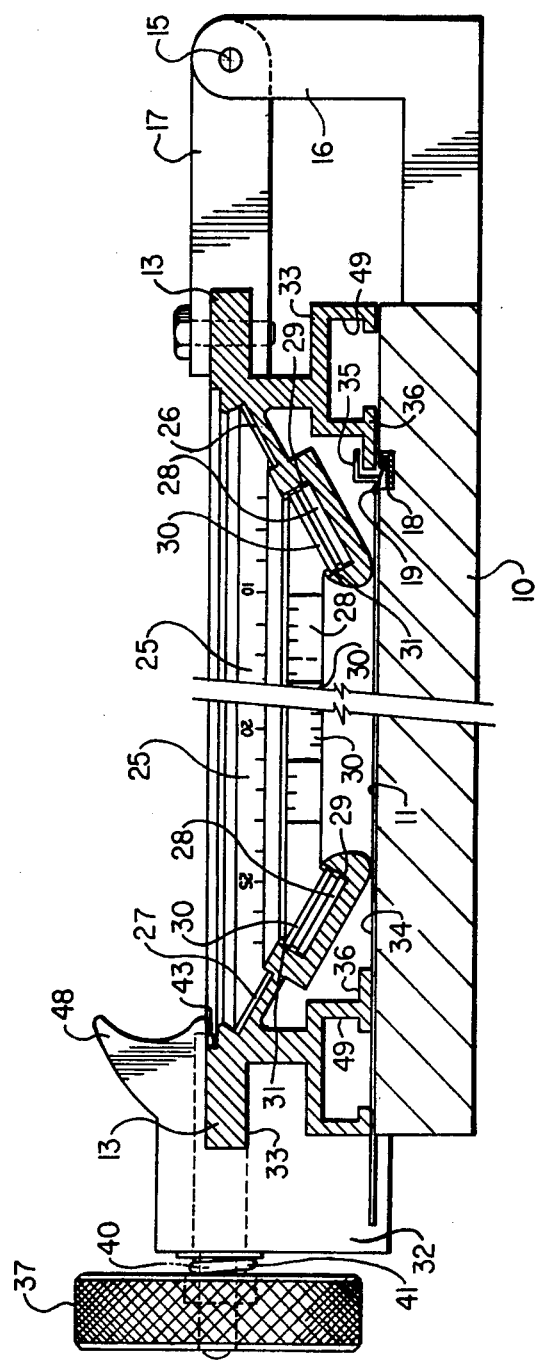
FIG. 2 is a cross sectional elevation taken on line 2—2 of FIG. 1.

Referring now to FIGS. 1 and 2, a base plate 10 is shown with a flat surface 11 on which a sheet of photographic paper may be placed. A rectangular open frame assembly 12 which in the example shown, is square in shape and has four equal length members 13. The frame assembly 12 is in the closed position with the base of the members 13 resting flush with the top surface 11 of the base plate 10. The cross section of all four members 13 is substantially the same as illustrated in FIG. 2. A hinge arrangement allows the frame 12 to be pivoted up from the base plate 10. The hinge arrangement includes a pivot line 15 positioned behind one edge of the base plate 10. The hinge arrangement has a bracket arm 16 extending out from each end of the lower portion of the base plate 10 connected by a pin at the pivot line 15 to a hinge arm 17 extending back from each end of one of the members 13. The hinge arrangement is preferably a pressure hinge which allows the frame 13 to be opened to any position and remain in that position. The pressure hinge prevents the frame 13 from dropping and impacting onto the base which causes vibration and in some cases moves the position of the masking blades. This U-shaped hinge arrangement permits one edge of the photographic paper to extend beyond the edge of the base plate almost as far as the pivot line 15.

As shown in FIG. 2, a paper locating slot 18 is positioned parallel and adjacent to the edge of the base plate 10 with the hinge arrangement. The edge of a sheet of photographic paper may be pushed into the slot 18 and a spring clip 19 slides backwards and forwards within the slot 18 for locating one corner of the sheet of paper. In this manner sheets of paper can be located in the same position on the base plate 10.

In a preferred embodiment a number of paper locating slots are provided on the surface 11 of the base plate for different standard sizes of photographic paper. In FIG. 1 a first pair of slots is provided for 7"×5" paper, the lower slot 20 is 7" in length to exactly take the long side of the paper and the upper slot 21 is 5" in length to exactly take the short side of the paper. A second pair of slots is provided for 10"×8" paper, the lower slot 22 being 10" in length and the upper slot 23 being 8" in length. Similarly, another pair of slots is positioned above the second pair of slots for 14"×11" paper, the lower slot 22A being 14" in length and the upper slot 23A being 11" in length. The upper slot 23A is spaced ¼" above the lower slot 22A located at the inner edge of the frame member 13. A spring clip 19 for locating the edge of off-size paper may be located in any of the slots. The pairs of slots allows standard paper sizes to be loaded in horizontal or vertical position. All other easels only allow a horizontal paper load. A fixed scale 24 on the right hand frame member 13 shown in FIG. 1 has a zero position that indicates the centre of the long side of a standard size sheet when the short side of the paper is inserted into one of the slots 21 or 23. In a similar manner a fixed scale 25 on the left hand frame member 13 has a zero position that indicates the centre of the short side of a standard size sheet when the long side of the paper is inserted into one of the slots 20 or 22.

A fixed scale 26 on the upper frame member 13 adjacent the pivot line 15 has a zero position at the centre of the plurality of slots, 20 to 23, as does another fixed scale 27 on the lower frame member 13.

A lower sliding scale 28, preferably made of an opaque plastic and having graduations along the outer edge slides in a lower sliding scale track 29 as shown in FIG. 2 of each frame member 13. An upper sliding scale 30 having a shorter length than the lower sliding scale 28 has graduations on the inner edge and slides in an upper sliding scale track 31 positioned directly above the lower sliding scale 28. The upper sliding scales 30 and the lower sliding scales 28 both have friction springs or other means so that the scales stay in a particular position when the frame 12 is raised. A raised lip may be provided on the ends of the sliding scales to grip the scales when sliding them in their tracks. For any size of paper the sliding scales can be positioned from the edge of the paper to exactly measure the border width on all four sides. In this manner, the border widths may be the same or different on each side. In the case of a standard size sheet, the sliding scales may be set from the edge of the sheet, for example, if a 10" sheet is being measured, the numbers on the fixed scales each represent ½", so the edges of the sliding scales are set at both 10 positions on the fixed scales.

Four removable carriages 32 are shown in FIG. 1 each carriage 32 is adapted to slide on a carriage track 33 as shown in FIGS. 2 and 3 which is a slot and forms part of each member 13 of the frame 12, each carriage 32 is rigidly attached at its base to a first end of a masking blade 34 which when the frame 12 is in the closed position, rests on the flat surface 11 of the base plate 10. Each masking blade 34 extends from the carriage 32 sliding in the carriage track 33 of one member 13 across to the member 13 on the opposite side of the frame 12. The second end of the masking blade 34 has a stepped end portion 35 which runs in a guide ledge 36 on the under side of the member 13 on the opposite side of the frame 12. As seen in FIG. 3, each carriage has a locking knob 37 which has a threaded hole 38 at the center thereof to mate with a threaded section 39 of a locking pin 40. A coiled spring 41 fits into a counter sunk ledge 42 in the locking knob 37. The locking pin 40 has a locking lip 43 which fits over a top shoulder 44 of each frame member 13 and a cut out 45 in the locking pin 40 fits over the top portion of the frame member 13. The locking pin 40 is placed over the frame member 13 with the locking lip 43 engaged with the top shoulder 44 and the carriage 32 slid forward so that the locking pin 40 passes through an aperture 46 in the carriage 32. A washer 47 is inserted over the end of the locking pin 40 followed by the coil spring 41. The locking knob 37 is then screwed onto the threaded section 39 of the locking pin 40 so that the carriage 32 is locked to the frame section 13. There are three positions of the locking knob 37 and carriage 32, a first position when the spring 42 exerts little or no pressure and the carriage 32 slides easily in the carriage track 33, a second position when the knob 37 is tightened somewhat so that there is a frictional resistance to the slidability of the carriage 32 in the carriage track, and a third position when the knob 37 is completely tightened and the carriage 32 is immovably locked to the frame member 13. In the second position, to move the carriage 32 easily, it is necessary to push the knob 37 in against the spring 41. This is achieved by squeezing together the knob 37 and a finger grip 48 on top of the carriage 32. When the locking knob 37 is unscrewed from the locking pin 40, the carriage 32 and masking blade 34 assembly may be removed from the frame 12. The carriage 32 ensures true tracking on the track 33 so that the masking blade 34 always remains exactly perpendicular to the frame member 13 on which the carriage 32 rides. Thus, two masking blades 34 on one section 13 always remain parallel to each other and at the same time perpendicular to two other masking blades 34 which run on one or more sections perpendicular to the first section 13. In this manner, the four masking blades always form a pure rectangular space to act as a border for a rectangular picture. As shown in FIG. 1, the arrangement of four masking blades is such that each masking blade crosses over a first perpendicular masking blade and underneath a second perpendicular masking blade.

The cross section of the member 13 has a slot 49 to allow a right angle corner piece (not shown) to be inserted therein. Each member 13 is cut at an angle of 45° at its end, the right angle corner pieces inserted into the slots 49 of two adjoining members 13, and the corner pieces clamped in place to form a rigid right angled corner.

In a preferred embodiment the frame member 13 is formed of an aluminum extrusion and the carriage 32 is formed of a hard plastic. The locking pin 40 and locking knob 37 are formed of nylon.

In operation, the frame 12 is pivoted back on the hinge line 15, and if the sliding spring clip 19 in the locating slot 18 is to be used, it is positioned for the desired size of paper. One edge of the sheet of paper is then located in the locating slot 18 or if it is a standard size sheet is located in one of the locating slots 20–23, and the frame is lowered to the closed position. The sliding scales 28 and 30 are positioned from the edges of the paper and the desired width of the border on the four sides of the paper is measured on the sliding scales to determine the position of the sliding carriages 32 and masking blades 34. The sliding carriages 32 are locked onto the tracks 33 of the members 13 and the easel is then moved underneath the enlarger for printing.

Another embodiment of a cross section of members for a frame, carriage and masking blade is shown in FIG. 4 wherein members 60 have two tapered slots 61 on the inside surface which form a carriage track, and a carriage 62 slides in these slots 61. The carriage 62 has a masking blade 63 rigidly attached to the base thereof and a locking knob 64 to clamp the carriage 62 in the grooved slots 61 holding the carriage 62 firmly to the member 60 and not allowing any tilting or movement of the masking blade 63. The masking blade 63 extends across the top surface of the base plate 65 and under the opposite section 60. The blade 63 has a curved end 66 which fits into a slot 67 on the outside of the section 60. The carriage 62 is formed in two parts and by unscrewing and removal of the locking knob 64 the top part of the carriage 62 may be removed and the carriage assembly taken off the section 60. The curved end 66 of the masking blade 63 may then be removed from the slot 67 in the section 60.

In a preferred embodiment the top surface 11 of the base plate 10 is formed of a magnetic material and the masking blades 34 are thin flexible steel. In this embodiment the masking blades are pulled towards the magnetic field of the base plate and hold the paper closely to the base plate thus avoiding fuzzy edges which sometimes occur if there is a gap between the blades and the paper. Furthermore, steel triangular corner clips may be used as paper positioning means to hold the paper in place. The clips are magnetically held to the easel base. The paper may be an oversize paper and may extend outside the frame and beyond the base plate. In such a situation, extra masking for the paper may be necessary.

Although four carriage and masking blade assemblies are shown in the drawings, the blades are interchangeable provided the frame is square. Any number of blade assemblies may be used on any one side. In some cases only one blade assembly may be required. If a blade assembly becomes damaged, it may be replaced with a spare.

The carriage and masking blade assemblies may be removed and special masking blade assemblies may be incorporated wherein the blades are at an angle. To form multiple images a series of extra thin blades may be used between images. When colour prints are to be made, the blades may be of the borderless type, which position the sheet of paper on the easel but allow the edges of the paper to be exposed to light. Furthermore, carriages may be attached to special blades to provide diamond, oval, round or zig-zap type borders. In a still further embodiment by use of magnetic material in the base plate, strips of steel may be used quite independent of a carriage.

In yet another embodiment, the base plate may be incorporated into a black border printer such as that shown in my U.S. application Ser. No. 891,814 filed Mar. 30, 1978 and now U.S. Pat. No. 4,154,526 issued May 15, 1979. A combination of my easel and border printer provides a flexible easel suitable for printing and a border printer for making any design of border required on a print.

A number of changes may be made to the design shown in the Figures herein without departing from the scope of the present invention which is only limited by the scope of the claims as follows.

The embodiments of the invention in which an exclusive property or privilege is claimed are defined as follows:

1. A photographic enlarging easel for positioning and masking a sheet of photographic paper comprising,
   base plate having a flat surface for the sheet of paper,
   rectangular open frame formed of four members, each having substantially similar cross sections, the frame pivoted about a pivot line parallel to and extending outside one edge of the base plate, the frame when in a closed position resting on the flat surface of the base plate allowing the sheet to extend beyond the base plate,
   paper positioning means for locating the paper on the base plate,
   plurality of removable carriages each carriage having a masking blade with a first end rigidly attached thereto, each carriage adapted to slide on a carriage track formed integral with each member and extending from side to side of the frame, a second end of the masking blade adapted to slide in a guide slot on an opposite member of the frame, the masking blade resting on the flat surface of the base plate when the frame is in the closed position, each carriage having a locking means to lock the carriage to the member at any position on the track,
   the frame having at least two sliding scales in each of two places adapted to measure border widths on four sides of the sheet in any location in the frame.

2. The easel according to claim 1 wherein the paper positioning means includes at least one paper locating slot for one edge of the sheet, the locating slot positioned parallel and adjacent to one edge of the base plate.

3. The easel according to claim 2 wherein the paper positioning means includes a plurality of paper locating slots for standard sizes of paper, one slot for the vertical side each standard size of paper, and one slot for the horizontal side.

4. The easel according to claim 1 wherein two sliding scales are provided on each member of the frame, and including a fixed scale on each member of the frame.

5. The easel according to claim 1 wherein the four members making up the open frame are the same length and the carriages with masking blades attached thereto are all the same length such that each carriage slides on the carriage track of any of the four members, and the second end of the masking blade slides in a guide slot of an opposite member of the frame.

6. The easel according to claim 1 wherein the four members are formed of extruded aluminum sections.

7. The easel according to claim 1 wherein the masking blades are held in contact with the base plate by magnetic attraction.

8. The easel according to claim 7 wherein the base plate is formed of magnetic material, and the masking blades are formed of steel strips.

9. The easel according to claim 7 wherein the paper positioning means includes steel triangular corner clips, and the base plate is formed of magnetic material.

10. The easel according to claim 1 wherein the locking means to lock the carriage to the member has three positions, a first position which allows free sliding movement of the carriage on the track, a second position which allows a friction sliding movement of the carriage on the track, and a third position which positively locks the carriage to the track in a perpendicular position.

11. The easel according to claim 1 wherein the carriage and masking blade may be replaced with a carriage having a special masking blade.

12. The easel according to claim 1 wherein the frame is pivoted about a base line by a pressure hinge means adapted to allow the frame to remain in any pivoted position above the base plate and allow vibration-free closing.

* * * * *